US010933620B2

(12) United States Patent
Sutcliffe et al.

(10) Patent No.: US 10,933,620 B2
(45) Date of Patent: Mar. 2, 2021

(54) ADDITIVE MANUFACTURING APPARATUS AND METHODS

(71) Applicant: RENISHAW PLC, Wotton-under-Edge (GB)

(72) Inventors: Christopher John Sutcliffe, Liverpool (GB); Jason Joannou, Stafford (GB); Jack Dunkley, Stone (GB); Ramkumar Revanur, Eccleshall (GB)

(73) Assignee: RENISHAW PLC, Wotton-under-Edge (GB)

( * ) Notice: Subject to any disclaimer, the term of this patent is extended or adjusted under 35 U.S.C. 154(b) by 367 days.

(21) Appl. No.: 15/528,701

(22) PCT Filed: Nov. 17, 2015

(86) PCT No.: PCT/GB2015/053482
§ 371 (c)(1),
(2) Date: May 22, 2017

(87) PCT Pub. No.: WO2016/079494
PCT Pub. Date: May 26, 2016

(65) Prior Publication Data
US 2018/0244034 A1 Aug. 30, 2018

(30) Foreign Application Priority Data

Nov. 21, 2014 (GB) .................................... 1420713
Nov. 21, 2014 (GB) .................................... 1420714
Nov. 21, 2014 (GB) .................................... 1420715

(51) Int. Cl.
B33Y 10/00 (2015.01)
B33Y 30/00 (2015.01)
(Continued)

(52) U.S. Cl.
CPC .............. *B33Y 30/00* (2014.12); *B01D 46/44* (2013.01); *B22F 3/105* (2013.01); *B29C 64/153* (2017.08);
(Continued)

(58) Field of Classification Search
CPC .................... B01D 46/0058; B01D 46/008; B01D 50/002; B01D 19/0063; B01D 2201/202;
(Continued)

(56) References Cited

U.S. PATENT DOCUMENTS 2,343,871 A    3/1944  Livoti
3,258,391 A    6/1966  Cornell et al.
(Continued)

FOREIGN PATENT DOCUMENTS

CN    1135732 A    11/1996
CN    2647402 Y    10/2004
(Continued)

OTHER PUBLICATIONS

Nov. 18, 2016 Office Action issued in Canadian Patent Application No. 2,738,618.
(Continued)

Primary Examiner — Darrin D Dunn
(74) Attorney, Agent, or Firm — Oliff PLC

(57) ABSTRACT

This invention concerns an additive manufacturing apparatus for building a part by selectively consolidating flowable material in a layer-by-layer process comprising a build chamber (101) for building the part, a module (105, 106) for providing a focussed energy beam for consolidating flowable material in the build chamber, a gas flow circuit for generating a gas flow through the build chamber (101). At least one filter assembly (200, 201) may be arranged in the gas flow circuit, the or each filter assembly (200, 201)

(Continued)

having associated therewith a valve (V-4, V-8) operable to seal the gas circuit upstream from the filter assembly (200, 201) and a valve (V-5, V-9) operable to seal the gas flow circuit downstream of the filter assembly (200, 201), the arrangement allowing a filter element (E-5, E-7) of the filter assembly (200, 201) to be changed whilst maintaining a controlled atmosphere in the build chamber (101). The apparatus may further comprise a purging device (210) configured to purge air from the or each filter assembly (200, 201) when the valves (V-4, V-5; V-8, V-9) associated with that filter assembly (200, 201) have sealed the filter assembly (200, 201) from the gas flow. Alternatively or additionally, a controller (131) may be arranged to control the valves (V-4, V-5; V-8, V-9) associated with the or each filter assembly (200, 201) such that the filter assemblies (200, 201) are closed off to gas flow from the build chamber (101) during a period in which the inert gas atmosphere in the build chamber (101) is compromised as a result of opening the door to the build chamber (101). The apparatus may comprise a pair of filter assemblies (200, 201) arranged in parallel within the gas flow circuit, the arrangement allowing a filter element (E-5, E-7) of the each filter assembly (200, 201) to be changed during a build by allowing the filter element (E-5, E-7) of one filter assembly (200, 201) to be changed whilst the filter element (E-5, E-7) of the other filter assembly (200, 201) is connected to filter particulates from the gas flow. A monitoring device (I-3, I-5) may be provided for detecting a property associated with the gas flow and a controller (131) arranged to control the valves to switch the filter assembly (200, 201) connected in line with the gas flow based upon signals from the monitoring device (I-3, I-5).

13 Claims, 8 Drawing Sheets

(51) Int. Cl.
*B29C 64/153* (2017.01)
*B29C 64/255* (2017.01)
*B29C 64/371* (2017.01)
*B01D 46/44* (2006.01)
*B22F 3/105* (2006.01)
*B29C 67/00* (2017.01)
*B01D 46/00* (2006.01)

(52) U.S. Cl.
CPC .......... *B29C 64/255* (2017.08); *B29C 64/371* (2017.08); *B29C 67/00* (2013.01); *B33Y 10/00* (2014.12); *B01D 46/0058* (2013.01); *B01D 46/0086* (2013.01); *B01D 46/0091* (2013.01); *B01D 46/0093* (2013.01); *B01D 46/446* (2013.01); *B22F 3/1055* (2013.01); *B22F 2003/1059* (2013.01); *Y02P 10/20* (2015.11); *Y02P 10/25* (2015.11)

(58) Field of Classification Search
CPC ............ B01D 2201/204; B01D 36/001; B01D 46/0012; B01D 46/04; B01D 46/46; B33Y 30/00
See application file for complete search history.

(56) References Cited

U.S. PATENT DOCUMENTS

| | | | |
|---|---|---|---|
| 3,868,237 A | 2/1975 | Berz | |
| 4,080,431 A | 3/1978 | Moss | |
| 4,632,757 A * | 12/1986 | Rosenberg | B01D 29/114 210/411 |
| 4,863,538 A | 9/1989 | Deckard | |
| 4,923,068 A | 5/1990 | Crowson | |
| 5,155,324 A | 10/1992 | Deckard et al. | |
| 5,398,193 A | 3/1995 | deAngelis | |
| 5,437,788 A | 8/1995 | Geibel et al. | |
| 5,460,733 A | 10/1995 | Rasmussen et al. | |
| 5,527,019 A * | 6/1996 | Schwarz | B01D 46/0068 266/135 |
| 5,530,221 A | 6/1996 | Benda et al. | |
| 5,733,441 A * | 3/1998 | Ko | B01D 17/10 134/111 |
| 5,766,486 A | 6/1998 | Cathcart et al. | |
| 5,772,879 A | 6/1998 | Jaikaran | |
| 5,795,359 A | 8/1998 | McLeish et al. | |
| 6,042,774 A | 3/2000 | Wilkening et al. | |
| 6,149,699 A | 11/2000 | Grantham | |
| 6,235,072 B1 | 5/2001 | Kopylov et al. | |
| 6,926,760 B2 | 8/2005 | Miebach | |
| 7,168,935 B1 | 1/2007 | Taminger et al. | |
| 7,261,550 B2 | 8/2007 | Herzog | |
| 7,435,368 B2 | 10/2008 | Davidson et al. | |
| 7,481,919 B1 * | 1/2009 | Keenan | F02M 37/0047 210/110 |
| 7,967,978 B2 * | 6/2011 | Bright | B01D 37/00 210/143 |
| 8,343,277 B2 * | 1/2013 | Takebayashi | C23C 16/4402 118/715 |
| 8,794,263 B2 * | 8/2014 | Scott | B29C 67/0085 137/599.14 |
| 9,291,170 B2 * | 3/2016 | Heymann | F04D 5/00 |
| 2002/0157994 A1 | 10/2002 | Tully et al. | |
| 2003/0019357 A1 * | 1/2003 | Tanaka | B01D 53/06 95/113 |
| 2003/0207655 A1 * | 11/2003 | Jackson | B08B 1/00 451/38 |
| 2004/0040941 A1 * | 3/2004 | Ecklund | G01C 19/661 219/121.63 |
| 2004/0153193 A1 | 8/2004 | Farnworth | |
| 2005/0072299 A1 | 4/2005 | Thomas | |
| 2006/0000518 A1 * | 1/2006 | Allen | B65B 31/041 141/67 |
| 2006/0168842 A1 * | 8/2006 | Sprague | F26B 23/002 34/396 |
| 2006/0192322 A1 | 8/2006 | Abe et al. | |
| 2006/0249023 A1 * | 11/2006 | Pranda | B01D 46/0058 95/273 |
| 2007/0252309 A1 | 11/2007 | Higashi et al. | |
| 2008/0029262 A1 | 2/2008 | Claxton | |
| 2008/0182506 A1 * | 7/2008 | Jackson | F24F 11/30 454/354 |
| 2009/0293988 A1 | 12/2009 | Pang et al. | |
| 2010/0071561 A1 * | 3/2010 | Marwitz | B01D 53/229 96/401 |
| 2011/0197761 A1 | 8/2011 | Matsuzaki et al. | |
| 2012/0279396 A1 * | 11/2012 | Brammer | B01D 19/0005 95/263 |
| 2013/0251863 A1 * | 9/2013 | Yousef | A23B 5/005 426/298 |
| 2014/0007619 A1 * | 1/2014 | Brown | C03B 27/0404 65/29.11 |
| 2014/0130673 A1 * | 5/2014 | Cabourdin | B01D 46/2407 95/268 |
| 2014/0131278 A1 * | 5/2014 | Sakamoto | B01D 41/04 210/636 |
| 2014/0131293 A1 * | 5/2014 | Mesawich | B01D 41/04 210/797 |
| 2014/0287080 A1 * | 9/2014 | Scott | B01D 46/0093 425/174.4 |
| 2015/0033944 A1 * | 2/2015 | Luven | B01D 45/12 95/268 |
| 2015/0037904 A1 * | 2/2015 | Celio | G01N 1/28 436/180 |
| 2015/0108095 A1 * | 4/2015 | Kruer | B23K 9/167 219/74 |

(56) References Cited

U.S. PATENT DOCUMENTS

| | | | | |
|---|---|---|---|---|
| 2015/0314152 A1* | 11/2015 | Moses | ............. | A62C 2/04 169/45 |
| 2015/0333467 A1* | 11/2015 | Tanaka | ............. | H01S 3/06704 372/6 |
| 2015/0367266 A1* | 12/2015 | Yoshida | ............. | B01D 19/0036 210/808 |
| 2016/0045860 A1* | 2/2016 | Stanton | ............. | C23C 16/4412 423/219 |
| 2018/0372347 A1* | 12/2018 | Carlson | ............. | F24F 3/1423 |

FOREIGN PATENT DOCUMENTS

| | | |
|---|---|---|
| DE | 955741 C | 1/1957 |
| DE | 3900973 C1 | 6/1990 |
| DE | 102004024850 A1 | 12/2005 |
| DE | 102006012933 A1 | 9/2007 |
| DE | 10 2006 014835 A1 | 10/2007 |
| DE | 102007030860 A1 | 12/2008 |
| DE | 20 2012 013036 U1 | 8/2014 |
| EP | 0315048 B1 | 8/1993 |
| EP | 2425886 A1 | 3/2012 |
| EP | 1521657 B2 | 4/2013 |
| GB | 652931 A | 5/1951 |
| JP | S31-012709 A | 8/1956 |
| JP | S60-179382 A | 9/1985 |
| JP | S61-124898 A | 6/1986 |
| JP | S62-056112 A | 3/1987 |
| JP | H03-003420 A | 1/1991 |
| JP | H04-17807 B2 | 3/1992 |
| JP | H05-013536 A | 1/1993 |
| JP | H06-072622 U | 10/1994 |
| JP | H06-296815 A | 10/1994 |
| JP | H09-239218 A | 9/1997 |
| JP | H10-061989 A | 3/1998 |
| JP | 2002-131198 A | 5/2002 |
| JP | 2004-301423 A | 10/2004 |
| JP | 2005-144635 A | 6/2005 |
| JP | 2008-255488 A | 10/2008 |
| JP | 2012-501828 A | 1/2012 |
| WO | 2010/007394 A1 | 1/2010 |
| WO | 2010/007396 A1 | 1/2010 |
| WO | 2010/026396 A2 | 3/2010 |
| WO | 2014/164807 A1 | 10/2014 |

OTHER PUBLICATIONS

Jan. 9, 2018 Office Action issued in U.S. Appl. No. 14/306,289.
Apr. 6, 2018 Office Action issued in European Patent Application No. 14 160 186.4.
Jun. 9, 2015 Search Report issued in Great Britain Patent Application No. GB1420713.8.
Jun. 9, 2015 Search Report issued in Great Britain Patent Application No. GB1420714.6.
Jun. 9, 2015 Search Report issued in Great Britain Patent Application No. GB1420715.3.
May 19, 2016 Search Report issued in International Patent Application No. PCT/GB2015/053482.
May 19, 2016 Written Opinion issued in International Patent Application No. PCT/GB2015/053482.
Mar. 1, 2010 Search Report issued in International Patent Application No. PCT/GB2009/002146.
May 10, 2012 Office Action issued in European Patent Application No. 09785068.9.
Apr. 17, 2013 Office Action issued in European Patent Application No. 09785068.9.
Apr. 23, 2013 Office Action issued in Chinese Patent Application No. 200980140091.6.
Jun. 18, 2013 Office Action issued in Japanese Patent Application No. 2011-525614.
Unknown Author, "Special HEPA Safe-Change Units", 2006, 1 page, EMCEL Filters Limited, United Kingdom.
Jan. 22, 2015 Notice of Opposition to European Patent issued in EP Patent No. 2331232.
Apr. 10, 2015 Search Report issued in EP Patent Application No. 14160186.
Dec. 1, 2015 Office Action issued in U.S. Appl. No. 14/306,289.
Apr. 14, 2016 Office Action issued in U.S. Appl. No. 14/306,289.
Nov. 23, 2016 Office Action issued in U.S. Appl. No. 14/306,289.
U.S. Appl. No. 14/306,289, filed Jun. 17, 2014 in the name of Simon Peter Scott et al.
Oct. 16, 2018 Office Action issued in U.S. Appl. No. 14/306,289.
Aug. 21, 2018 Office Action issued in Chinese Patent Application No. 201580070632.8.
Sep. 20, 2018 Office Action issued in European Patent Application No. 15800894.6.
Aug. 18, 2017 Office Action issued in U.S. Appl. No. 14/306,289.
Dec. 11, 2020 Notice of Allowance issued in U.S. Appl. No. 14/306,289.

* cited by examiner

ADDITIVE MANUFACTURING APPARATUS AND METHODS

FIELD OF INVENTION

This invention concerns additive manufacturing apparatus and methods in which layers of material are consolidated in a layer-by-layer manner to form a part. The invention has particular, but not exclusive, application, to selective laser solidification apparatus, such as selective laser melting (SLM) and selective laser sintering (SLS) apparatus.

BACKGROUND

Selective laser melting (SLM) and selective laser sintering (SLS) apparatus produce parts through layer-by-layer solidification of a material, such as a metal powder material, using a high energy beam, such as a laser beam. A powder layer is formed across a powder bed in a build chamber by depositing a heap of powder adjacent to the powder bed and spreading the heap of powder with a wiper across (from one side to another side of) the powder bed to form the layer. A laser beam is then scanned across areas of the powder layer that correspond to a cross-section of the part being constructed. The laser beam melts or sinters the powder to form a solidified layer. After selective solidification of a layer, the powder bed is lowered by a thickness of the newly solidified layer and a further layer of powder is spread over the surface and solidified, as required. An example of such a device is disclosed in U.S. Pat. No. 6,042,774.

The solidification process is carried out in an inert gas atmosphere, such as an argon or nitrogen atmosphere, as the metal powder is highly reactive. To remove condensate produced during the process, a gas knife of inert gas is generated across the powder bed between a nozzle and an exhaust. Gas collected by the exhaust is recirculated through a gas circuit back to the nozzle. A filter in the gas circuit filters condensate from the recirculated gas.

WO2010/007394 discloses a parallel filter arrangement in which the gas flow through the circuit can be switched between either one of two filter assemblies such that the filter element in the other filter assembly can be replaced during a build.

A problem with such an arrangement is that air that enters into the filter housing when the filter is replaced is reintroduced into the build chamber when gas flow is directed past the replaced filter. Furthermore, the manual switch-over of the filters during a build can interrupt the gas knife, affecting the quality of the layers built during that period.

To remove a part from the build chamber, a door is opened allowing air into the build chamber. This air can enter into the filter assemblies potentially causing particles collected on used filter elements to ignite.

SUMMARY OF INVENTION

According to a first aspect of the invention there is provided an additive manufacturing apparatus for building a part by selectively consolidating flowable material in a layer-by-layer process comprising a build chamber for building the part, a module for providing a focussed energy beam for consolidating flowable material in the build chamber, a gas flow circuit for generating a gas flow through the build chamber, a pair of filter assemblies arranged in parallel within the gas flow circuit, each filter assembly having associated therewith a valve operable to seal the gas circuit upstream from the filter assembly and a valve operable to seal the gas flow circuit downstream of the filter assembly, the arrangement allowing a filter element of the each filter assembly to be changed during a build by allowing the filter of one filter assembly to be changed whilst the filter element of the other filter assembly is connected to filter particulates from the gas flow, a monitoring device for detecting a property associated with the gas flow and a controller arranged to control the valves to switch the filter assembly connected in line with the gas flow based upon signals from the monitoring device.

The monitoring device may be a pressure sensor. For example, the pressure sensor may measure a pressure indicative of the pressure drop across the filter assemblies. The controller may be arranged to control the valves associated with the assemblies to switch the filter assembly connected in line with the gas flow when the pressure sensor detects a pressure indicative of the pressure drop being above a predetermined level. As the filter element becomes blocked with particulates, the pressure drop across the filter element may increase. The filter element will fail/break when the pressure drop across the filter element becomes too great. Switching the filter assembly connected in line with the gas flow when the pressure sensor detects that the pressure drop is above a predetermined level may prevent failure/breakage of the filter element and recirculation of unwanted particulates.

The apparatus may comprise a pump for generating the gas flow in the gas circuit and the monitoring device may be a device for measuring/reporting on a property that is indicative of a speed of the pump. The pump may be controlled to maintain a set gas flow through the build chamber, the measured/reported property being indicative of how hard the pump has to work in order to achieve the set gas flow. It may be desirable to replace the filter element, if the filter element is blocked to such an extent that the pump has to be driven outside of set limits in order to maintain the set gas flow.

The apparatus may comprise a sensor for measuring a velocity of the gas flow in the build chamber and the controller may be arranged to switch the filter assembly connected in line with the gas flow based upon the measured velocity.

The controller may be arranged to control the valves associated with the filter assemblies to switch the filter element connected in line with the gas flow during a predetermined stage of the repeated layer-by-layer build process. For example, the controller may be arranged to control the valves associated with the filter assemblies to switch the filter assembly connected in line with the gas flow when the flowable material is not being consolidated by the energy beam, such as during dosing of the flowable material and/or during spreading of a layer of flowable material by a wiper. Significant condensate to be carried away by the gas flow is generated during consolidation of the flowable material with the energy beam, accordingly a momentary change in the gas flow caused by switching over the filter assemblies connected in line with the gas flow is undesirable during this stage of the repeated build process, as it may affect the build quality. Switching during a period in which the flowable material is not being consolidated by the energy beam eliminates the possibility that a change in the gas flow during switch-over affects the build quality. The controller may also be given sufficient time, for example during a wipe, to determine a pump speed required in order to achieve a set gas flow after switching over the filter assemblies and before the energy beam starts consolidating flowable material.

According to a second aspect of the invention there is provided an additive manufacturing apparatus for building a part by selectively consolidating flowable material in a layer-by-layer process apparatus comprising a build chamber for building the part, a module for providing a focussed energy beam for consolidating flowable material in the build chamber, a gas flow circuit for generating a gas flow through the build chamber, at least one filter assembly arranged in the gas flow circuit, the or each filter assembly having associated therewith a valve operable to seal the gas circuit upstream from the filter assembly and a valve operable to seal the gas flow circuit downstream of the filter assembly, the arrangement allowing a filter element of the filter assembly to be changed whilst maintaining a controlled atmosphere in the build chamber, the apparatus further comprising a purging device configured to purge air from the or each filter assembly when the valves associated with that filter assembly have sealed the filter assembly from the gas flow.

In one embodiment, the purging device may be arranged to flush the or each filter assembly with an inert gas to remove air from the filter assembly. For example, the gas circuit may comprise, for the or each filter assembly, an inlet between the filter element of the filter assembly and one of the valves for introducing inert gas into the filter assembly and a vent between the filter element and the other of the valves for removing air pushed from the valve assembly by the inert gas. The inlet and vent may be located such that inert gas is flushed through the filter element in an opposite direction to the gas flow when the filter assembly is connected to the gas circuit.

In another embodiment, the purging device may be arranged to apply a low pressure or a vacuum pressure to the or each filter assembly to remove air from the filter assembly.

The additive manufacturing apparatus may comprise a controller arranged to control the valves and the purging device such that air is purged from the or each filter assembly before the valves associated with that filter assembly are opened to connect the filter assembly in line with the gas flow.

The apparatus may comprise first and second filter assemblies arranged in parallel within the gas flow circuit, wherein the purging device is arranged to flush one of the first and second filter assemblies whilst the other of the first and second filter assemblies is connected to filter particulates from the gas flow.

According to a third aspect of the invention there is provided an additive manufacturing apparatus for building a part by selectively consolidating flowable material in a layer-by-layer process comprising a build chamber for building the part, the build chamber having a door for accessing the part, a module for providing a focussed energy beam for consolidating flowable material in the build chamber, means for forming an inert gas atmosphere in the build chamber, a gas flow circuit for generating an inert gas flow through the build chamber, at least one filter assembly arranged in the gas flow circuit, the or each filter assembly having associated therewith a valve operable to seal the gas circuit upstream from the filter assembly and a valve operable to seal the gas flow circuit downstream of the filter assembly, the apparatus further comprising a controller arranged to control the valves associated with the or each filter assembly such that the filter assemblies are closed off to gas flow from the build chamber during a period in which the inert gas atmosphere in the build chamber is compromised as a result of opening the door to the build chamber.

In this way, oxygen that enters into the build chamber when the door is opened is not pulled through the filter assemblies, which could cause particulates collected on the filter elements to ignite and consequential, destruction of the filter element.

The controller may be arranged to operate the valves to close off the filter assemblies to gas flow from the build chamber after a build has finished and before the door is opened. The door may comprise a lock for locking the door shut and the controller may control the lock to maintain the door locked until the valves have been operated to close off the filter assemblies to gas flow from the build chamber.

The apparatus may comprise a pump arranged to create a low pressure or a vacuum pressure in the build chamber, the controller arranged to arranged to control the valves such that the filter assemblies are closed off to gas flow from the build chamber during a period in which the pump is operated to remove oxygen from the build chamber.

The apparatus may comprise an oxygen sensor for measuring an oxygen level in the build chamber, the controller arranged to open the valves associated with the or each filter assembly when the oxygen levels detected by the oxygen sensor are below predetermined levels.

According to a fourth aspect of the invention there is provided an additive manufacturing apparatus for building a part by selectively consolidating flowable material in a layer-by-layer process comprising a build chamber for building the part, a module for providing a focussed energy beam for consolidating flowable material in the build chamber, a gas flow circuit for generating an inert gas flow through the build chamber and/or for transporting flowable material, and a controller arranged to establish a gas flow through the gas circuit during a period after the part has been built and before formation of an inert atmosphere in the build chamber for a subsequent build.

The gas flow may act to carry particles in the gas flow circuit to a collection point for removal from the apparatus in order to clean the gas circuit for a material changeover.

The apparatus may comprise at least one separator arranged in the gas flow circuit to separate particles from the gas flow. The separator may comprise one or more filter elements. The or each filter element may have associated therewith a valve operable to seal the gas circuit upstream from the filter element and a valve operable to seal the gas flow circuit downstream of the filter element, wherein the controller is arranged to establish the gas flow by operating the valves to allow the gas flow through the at least one filter element. The separator may comprises a baffle for slowing the gas flow such that particles drop out of the gas flow for collection in a hopper. The separator may cause the particles to collect at a collection point (such as in the filter element or the hopper) for removal from the machine.

The gas flow circuit may comprise parallel gas lines, a first line of the parallel gas lines for generating an inert gas flow through the build chamber and a second of the parallel gas lines for transporting flowable material recovered from the build chamber to a device for delivering the flowable material for the formation of a layer, wherein the gas flow is established though the second line to transport flowable material, which remains in the second line after the build, to the separator. The controller may be arranged to close off the first line to the gas flow such that the gas flow bypasses the build chamber. In this way, the gas flow does not pull particles present in the build chamber through the gas circuit during, for example, a cleaning cycle. The build chamber may be cleaned by other means, for example a manually operated suction nozzle in the build chamber, as the gas flow generated through the build chamber by the gas circuit may be insufficient to remove all of the flowable material therein.

The controller may be arranged to establish the gas flow by activating a pump of the gas flow circuit. The controller may be arranged to establish the gas flow in response to a user input indicating that a type of flowable material to be used with the additive manufacturing apparatus is to be changed.

The gas circuit may be for transporting the flowable material to a dispense hopper from which the flowable material is controllably dosed for each layer. The gas circuit may be for transporting the flowable material recovered from the build chamber to the dispense hopper. The gas circuit may be for transporting the flowable material dispensed from a storage hopper to the dispense hopper.

The controller may establish the gas flow when a mechanism controlling dispense of powder into the gas circuit from the storage hopper is closed/deactivated.

According to a fifth aspect of the invention there is provided a method of changing flowable material in an additive manufacturing apparatus comprising a build chamber for building the part, a module for providing a focussed energy beam for consolidating flowable material in the build chamber, a gas flow circuit for generating an inert gas flow through the build chamber and/or for transporting flowable material, the method comprising establishing a gas flow through the gas circuit during a period after the part has been built and before formation of an inert atmosphere in the build chamber for a subsequent build such that flowable material in the gas flow circuit is carried to a collection point by the gas flow.

The collection point may be a separator for separating particles from the gas flow. The separator may comprise a filter element.

According to a sixth aspect of the invention there is provided a controller for use in an additive manufacturing apparatus according to the fourth aspect of the invention, the controller programmed to control the additive manufacturing apparatus to perform the method of the fifth aspect of the invention.

According to a seventh aspect of the invention there is provided an additive manufacturing apparatus for building a part by selectively consolidating flowable material in a layer-by-layer, the apparatus comprising a build chamber for building the part, a module for providing a focussed energy beam for consolidating flowable material in the build chamber, a gas flow circuit for generating a gas flow through the build chamber, at least one filter assembly arranged in the gas flow circuit, the or each filter assembly comprising a filter housing containing a filter element, a valve operable to seal the filter housing upstream of the filter element and a valve operable to seal the filter housing downstream of the filter element, the apparatus further comprising at least one clamp for clamping the or each filter assembly in place in the apparatus, wherein operation of one of the or both valves of the filter assembly releases the clamp to allow removal of the filter assembly from the apparatus.

The filter assembly may comprise a manually operated handle for operating the valve and a lug movable with the handle to engage with a complementary cut in the apparatus when the handle is moved to open the valve to lock the filter assembly to the apparatus.

The additive manufacturing apparatus may further comprise one or more sensors for detecting a state of the valves of the filter assembly and a controller for controlling operation of the clamp, wherein the controller is arranged to operate the clamp to release the filter assembly when closure of the valves has been detected using the one or more sensors.

According to an eighth aspect of the invention there is provided a controller for use in an additive manufacturing apparatus in which parts are built by selectively consolidating flowable material in a layer-by-layer process, the apparatus comprising a build chamber for building the part, a module for providing a focussed energy beam for consolidating flowable material in the build chamber, a gas flow circuit for generating a gas flow through the build chamber, at least one filter assembly arranged in the gas flow circuit, the or each filter assembly comprising a filter housing containing a filter element, a valve operable to seal the filter housing upstream of the filter element and a valve operable to seal the filter housing downstream of the filter element, the apparatus further comprising an electronically operated clamping device for clamping the or each filter assembly in place in the apparatus and one or more sensors for detecting a state of the valves of the filter assembly, the controller programmed to control the additive manufacturing apparatus such that the clamping device is operated to release the filter assembly when closure of the valves has been detected using the one or more sensors.

DESCRIPTION OF EMBODIMENTS

Figure 1:
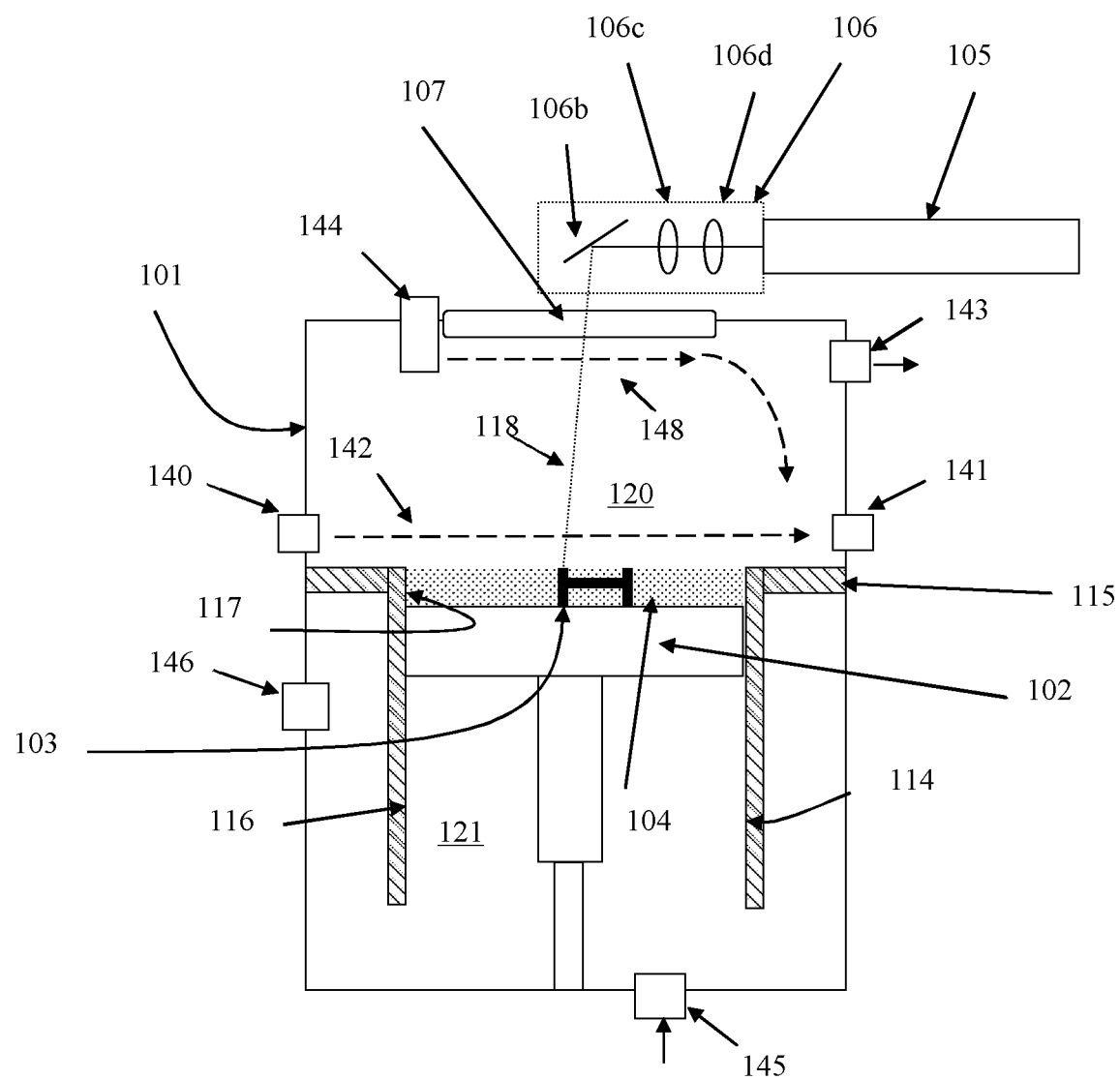
FIG. 1 is a schematic diagram of an additive manufacturing apparatus according to one embodiment of the invention.
Figure 2:
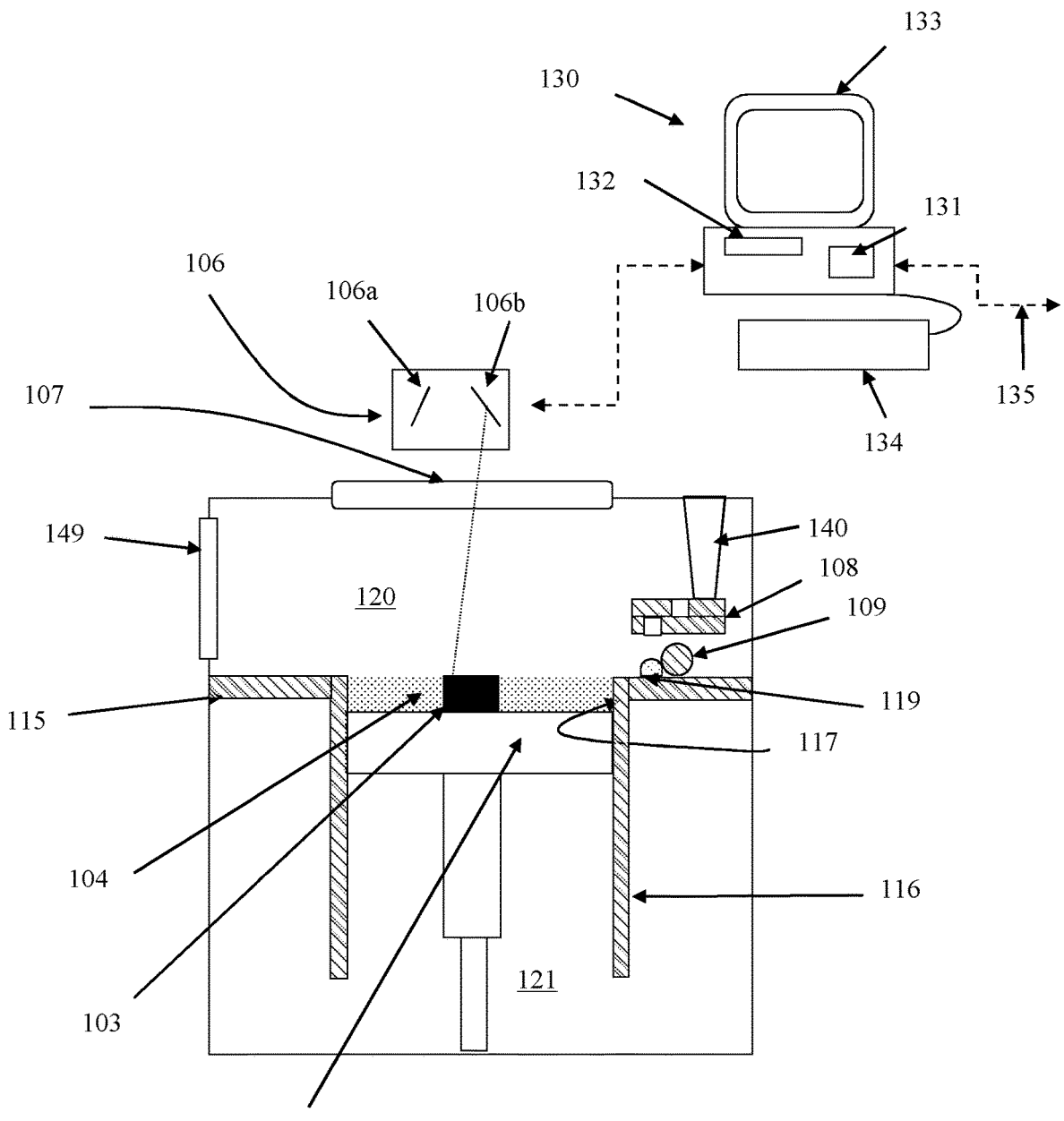
FIG. 2 is a schematic diagram of the additive manufacturing apparatus from another side.

Referring to FIGS. 1 and 2, an additive manufacturing apparatus according to an embodiment of the invention comprises a build chamber 101 having therein partitions 115, 116 that define a build cylinder 117 and a surface onto which powder can be deposited. A build platform 102 is provided for supporting a part 103 built by selective laser melting powder 104. The platform 102 can be lowered within the build cylinder 117 as successive layers of the part 103 are formed. A build volume available is defined by the extent to which the build platform 102 can be lowered into the build cylinder 117. The build cylinder 117 and build platform 102 may have any suitable cross-sectional shape, such as circular, rectangular and square.

Partitions 115, 116 and the build platform 102 split the build chamber 101 into an upper chamber 120 and a lower chamber 121. Seals (not shown) around the build platform 102 prevent powder from entering into the lower chamber 121. A gas connection, such as a one-way valve, may be provided between the upper and lower chambers 120, 121 to allow gas to flow from the lower chamber 121 to the upper chamber 120. As described below, the lower chamber 121 may be kept at a slight over-pressure relative to the upper chamber 120.

Layers of powder 104 are formed as the part 103 is built by dispensing apparatus 108 for controlled dispense from a hopper 140 and an elongate wiper 109. For example, the dispensing apparatus 108 may be apparatus as described in WO2010/007396.

A laser module 105 generates a laser for melting the powder 104, the laser directed as required by optical scanner 106 under the control of a computer 130. The laser enters the chamber 101 via a window 107.

The optical scanner 106 comprises steering optics, in this embodiment, two movable mirrors 106a, 106b for directing the laser beam to the desired location on the powder bed 104 and focussing optics, in this embodiment a pair of movable lenses 106c, 106d, for adjusting a focal length of the laser beam. Motors (not shown) drive movement of the mirrors 106a and lenses 106b, 106c, the motors controlled by processor 131.

A computer 130 controls modules of the additive manufacturing apparatus. Computer 130 comprises the processor unit 131, memory 132, display 133, user input device 134, such as a keyboard, touch screen, etc., and a data connection to the modules. Stored on memory 132 is a computer program that instructs the processing unit to carry out the method as now described.

The apparatus comprises a gas nozzle 140 and a gas exhaust 141 for generating a gas flow 142 through the chamber 101 across the build platform 102. The gas flow 142 acts as a gas knife carrying condensate created by the melting of the powder with the laser away from the build area. The apparatus comprises a further gas nozzle 144 for generating a gas flow 148 across the window 107. This gas flow may prevent condensate from collecting on the window 107, which in turn could affect the quality of the laser beam 118 delivered through the window 107.

A vent 143 provides a means for venting/removing gas from the chambers 120, 121.

A backfill inlet 145 provides an inlet for backfilling the chambers 120, 121 with inert gas. The lower chamber 121 may comprise a further inlet 146 for maintaining the lower chamber 121 at an overpressure relative to the upper chamber 120.

Figure 3:
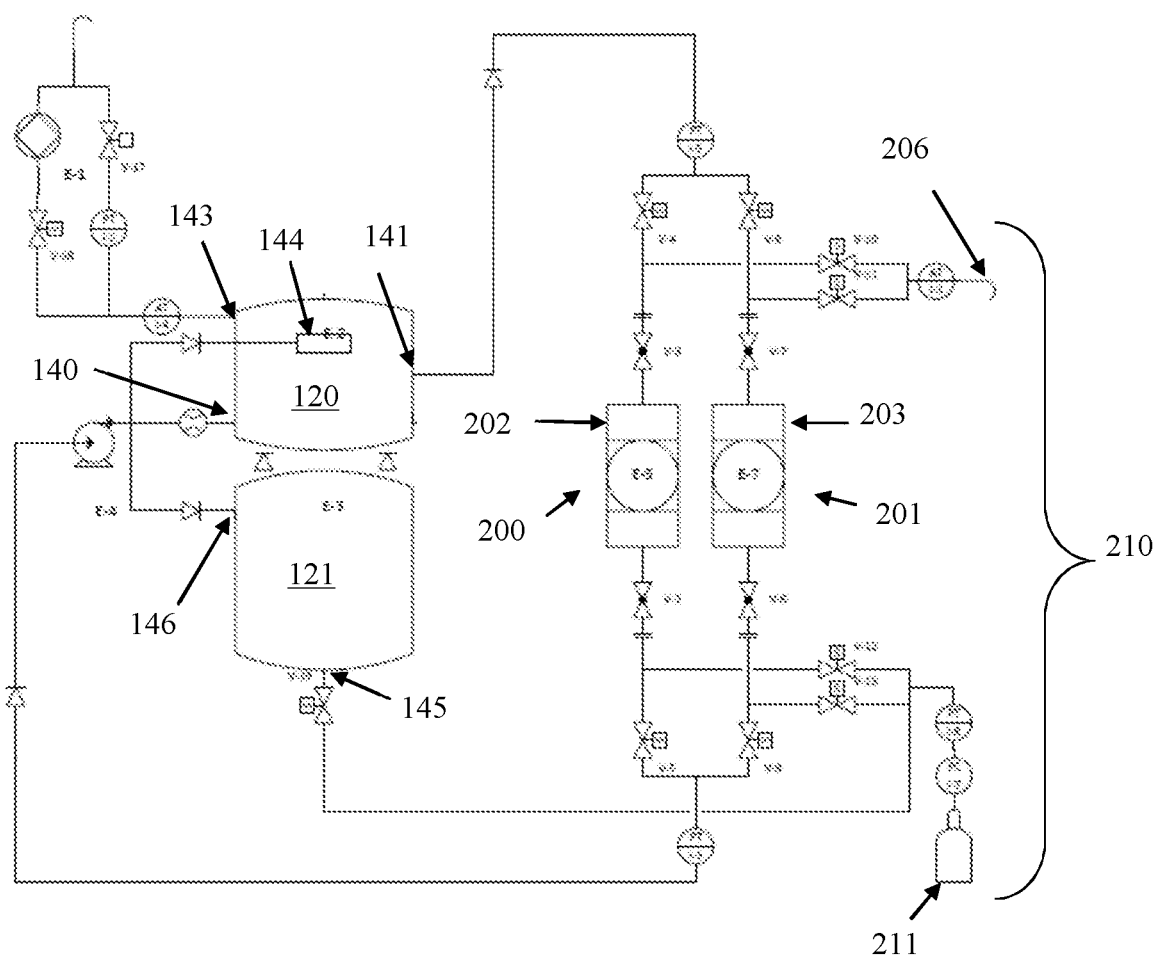
FIG. 3 is a circuit diagram of a gas flow circuit according to one embodiment of the invention.

The gas nozzles 140, 144, gas exhaust 141, backfill inlet 145 and further inlet 146 form part of a gas flow circuit 160 as shown in FIG. 3.

The gas flow circuit comprises filter assemblies 200, 201 connected in parallel within the gas circuit to filter particulates within the recirculated gas. Each filter assembly 200, 201 comprises a filter housing 202, 203, a filter element E-5, E-7 located in the filter housing 202, 203 and manually operated valves V-2, V-3, V6, V-7 for opening and closing gas inlet and gas outlet, respectively. Each filter assembly 200, 201 is detachable from the gas circuit for replacement of the filter, as is described in WO2010/026396 (see FIG. 4b).

Each parallel line 212, 213 has a pair of solenoid valves V-4, V-5; V-8, V-9 one upstream and one downstream of the filter assembly 200, 201, controlled by computer 130. The pair of valves V-4, V-5; V-8, V-9 allow the filter assembly 200, 201 to be isolated from the gas circuit for removal of the filter assembly 200, 201 during replacement of the filter element E-5, E-6.

A purging device 210 is provided for flooding the filter assemblies 200, 201 with an inert gas. The purging device 210 comprises a supply of inert gas 211 that can be fed separately into each parallel line 212, 213, downstream of the filter assembly 200, 201, under the control of solenoid valves V-12, V-13. A pressure controller I-7 and pressure transducer I-8 may control and measure the pressure of inert gas from the gas source 211. The purging device 210 further comprises a vent 206 for venting gas pushed from the filter assemblies 200, 201 by the inert gas introduced from the gas source 211. Solenoid valves V-10, V-11 individually control the venting of each filter assembly 200, 201. An oxygen sensor I-1 is provided for detecting the amount of oxygen in the gas vented through vent 206.

Pressure transducer I-5 monitors the pressure of the gas flow upstream of the T-junction that splits the gas circuit into parallel lines and pressure transducer I-3 monitors the pressure of gas flow downstream of the T-junction that joins the parallel lines back into a single line. The pressure transducers I-5, I-3 are connected with computer 130 to feedback to computer 130 a pressure difference across the connected filter assembly 200, 201.

Pump E-4 generates the gas flow though the gas circuit. Gas exiting pump E-4 passes to gas nozzles 140, 144 to produce gas knives across the build surface and the window 107. The pump may also deliver the gas to the inlet 146 in the lower chamber 121 for maintaining the lower chamber 121 at an overpressure relative to the upper chamber 120. Exhaust 141 is connected to the filter assemblies 200, 201 via pressure transducer I-5 to complete the gas circuit.

The backfill inlet 145 is connected to the source of inert gas 211 and the flow of inert gas to the backfill inlet is controlled by solenoid valve V-19.

Vent 143 is connected to solenoid valve V-18 and vacuum pump E-1, which provide means for creating a low pressure or vacuum in the upper and lower chambers 120, 121. An oxygen sensor I-4 detects the amount of oxygen present in the gas exiting from the chambers 120, 121 via vent 143. Vent 143 is also connected to a pressure transducer I-2 and vent valve V-17. Pressure transducer I-2 measures the pressure of gas at the vent 143 and the vent valve V-17 is opened if excessive pressure is measured by pressure transducer I-2. Typically, the upper chamber 120 is maintained at a slight overpressure relative to atmospheric pressure.

FIGS. 4a to 4d show the process of automatically detecting when a filter element should be changed, the automatic switch over between filter assemblies 200, 201 and processes carried out when a filter element is replaced. In FIGS. 4a to 4d, gas flow along a gas path is indicated by a broader grey line compared to the thinner black line used to indicate no flow.

Figure 4B:
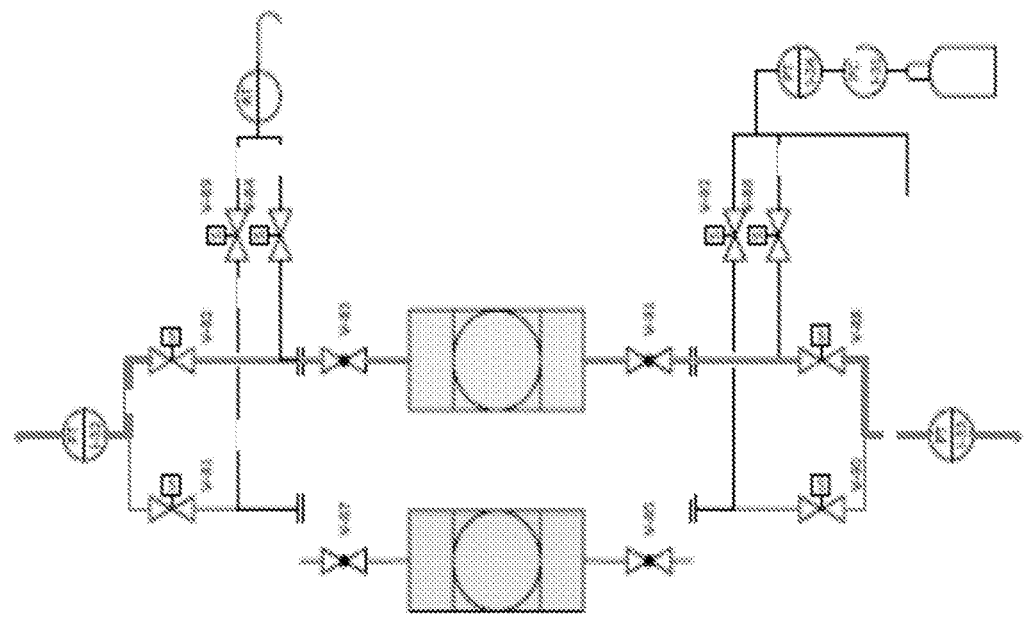
FIGS. 4a to 4d show a method of automatically switching between the filter assemblies, replacing a filter element and purging a filter housing after replacement of the filter element.
Figure 4A:
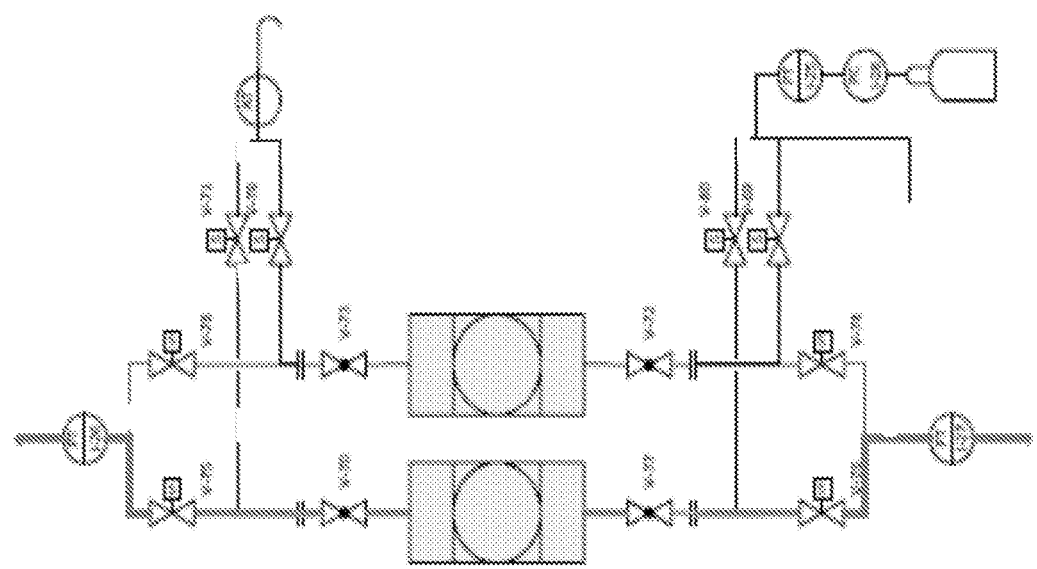
Figure 4D:
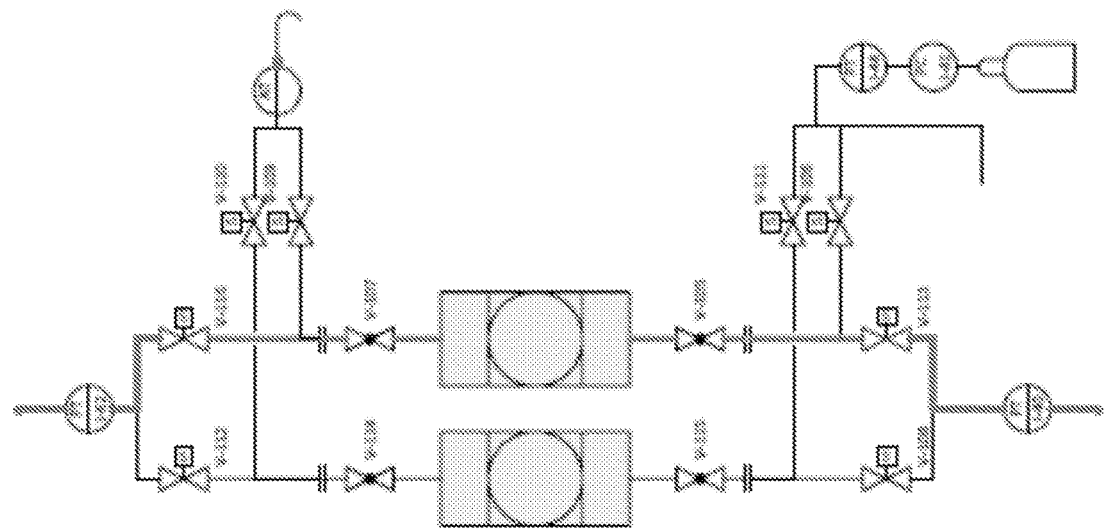

During laser melting of the powder, one of the two filter assembles 200, 201 is connected in line such that the gas flows therethrough via appropriate operation of valves V-4, V-5, V-8 and V-9. In FIG. 4a, filter assembly 200 is shown connected in line and filter assembly 201 is closed off to gas flow.

The pressure transducers I-5 and I-3 measure the pressure of the gas flow either side of the connected filter assembly 200 and report this to computer 130. Computer 130 determines whether the pressure drop across the connected filter assembly 200 is above a predetermined level. If the pressure drop is determined to be above the predetermined level, the computer activates valves V-4, V-5, V-8 and V-9 to connect filter assembly 201 in-line with the gas flow and to close off filter assembly 200 to the gas flow. The computer 130 may time the switch-over such that it occurs during a period in the build when the laser beam 118 is not scanning the powder bed 104. For example, the switch-over may occur during dosing of the powder or spreading of the powder by the wiper 109. An alert is provided on display 133 to indicate to the user that the filter element E-5 requires replacement.

Figure 7:
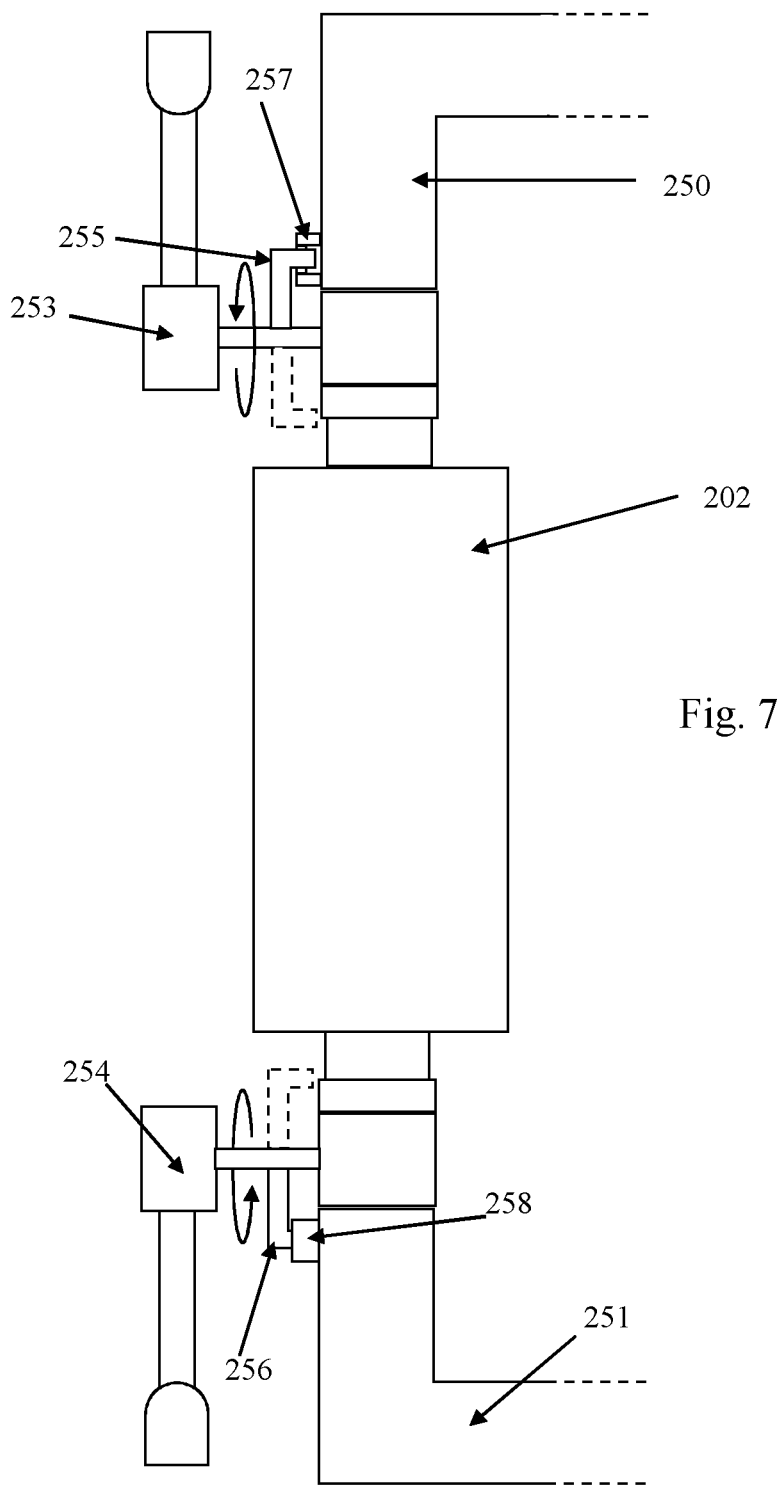
FIG. 7 is a side view of a filter assembly and the connection to the apparatus according to an embodiment of the invention.

To replace the filter element E-5, the user shuts-off manually operated valves V-2 and V-3 to prevent powder from escaping from housing 202. In one embodiment, the filter assembly 200, 201 is locked in place between inlet pipe 250 and outlet pipe 251 on the apparatus until closure of the manual valves V-3 and V-2 or V-7 and V-4. Referring to FIG. 7, the filter assembly 200 comprises handles 253 and 254 for operating valves V-3 and V-2, respectively. Movable with each handle 253, 245 is a lug 255, 256. When the handle 253, 254 is moved to the position shown in FIG. 7, the lug 255, 256 engage with a cut/recess 257, 258 fixed to the inlet pipe 250/outlet pipe 251 such that the filter assembly cannot be detached from the apparatus. Rotating the handles 253, 254 to close the valves moves the lugs 255, 256 out of the cut/recess 257, 258 to release the filter assembly 200 for removal from the apparatus. Filter assembly 201 has a similar arrangement. This ensures that the filter assemblies 200, 201 can only be removed from the apparatus when the valves V-2, V-3, V-7 and V-4 are closed.

With the valves V-2 and V-3 closed, the filter assembly 200 can be removed from the apparatus and the filter element E-5 replaced using the method disclosed in WO2010/007394. With filter assembly 200 removed from the apparatus, the build continues with the gas flow directed through filter assembly 201 is shown in FIG. 4b.

Figure 4C:
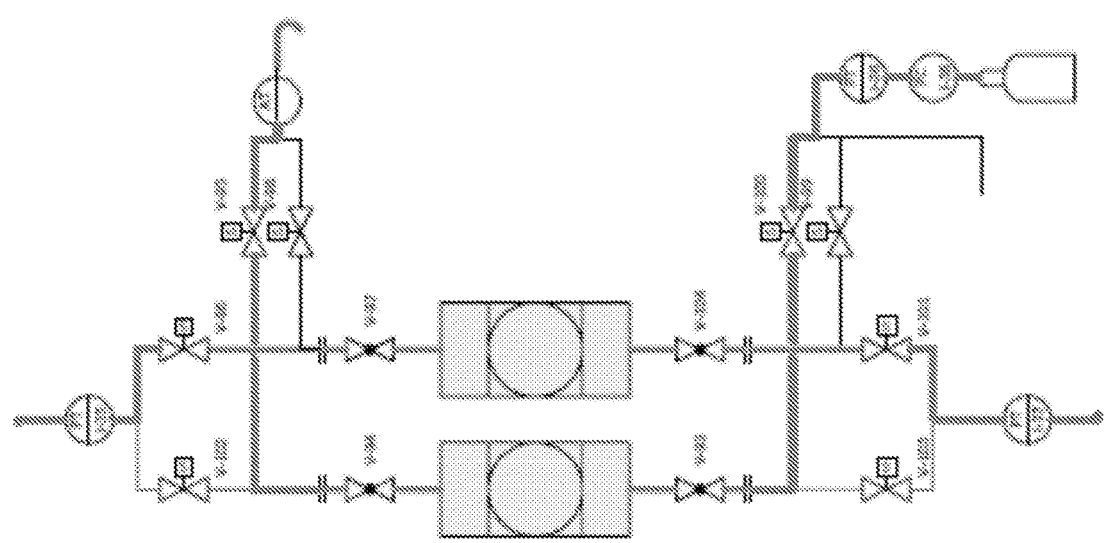

The filter assembly 200 with a new filter element E-5 is connected to the gas circuit by the user. The user may indicate to the apparatus that the filter assembly 200 has been reconnected using the user interfaces of computer 130. Upon receiving an indication that the filter assembly 200 has been reconnected, the computer activates valves V-12 and V-10, to flood the housing 202 with inert gas with oxygen pushed from the housing 202 out through vent 206 (as shown in FIG. 4c). To facilitate this process, the vent 206 is located above the inert gas source 211 as oxygen is lighter than argon (which is typically used as the inert gas) and will be pushed ahead of the argon gas as it is introduced into the housing 202.

Inert gas is passed through housing 202 until the oxygen content detected by oxygen sensor I-1 is below a predetermined level. Upon receiving a signal from oxygen sensor I-1 that the oxygen content at vent 206 is below a predetermined level, the computer 130 activates valves V-12, V-10 to close off the housing 202 to the inert gas source 211 and vent 206. The filter assembly 200 is now ready to be used when the filter element E-7 reaches the end of its life, as indicated by the pressure transducers I-5, I-3. Switch-over from filter assembly 201 to filter assembly 200 can occur in a similar manner to that described above.

With such an automated switch-over process, the apparatus can continue with a build in an automated manner when a filter element comes to the end of its life without requiring intervention of the user. The user can then replace the expired filter element E-5, E-7 as and when the user is free to do so. Accordingly, the apparatus does not require constant monitoring by the user during a build. Furthermore, purging of the filter assembly 200. 201 before the filter assembly 200, 201 is connected in line with the gas flow ensures that the oxygen content in the build chambers 120, 121 remains low, even upon switch-over of the filter assembly 200, 201.

At the end of a build, before a door 149 to the build chamber is opened to remove the part, the computer 130 controls valves V-4, V-5, V-8, V-9 to close off both filter assemblies 200, 201 to gas flow from the gas circuit and chambers 120, 121. In this way, the gas assemblies 200, 201 are isolated from oxygen that may flow into the chambers 120, 121 and gas circuit when the door 149 to the build chamber is opened.

Before a start of a build, a low oxygen atmosphere is formed in chambers 120, 121. The low oxygen atmosphere is formed by first forming a low pressure (significantly below atmospheric pressure) or vacuum pressure in chamber 120, 121 using vacuum pump E-1. The chambers 120, 121 are then backfilled with inert gas through inlet 145. During this process, the computer maintains control valves V-4, V-5, V-8, V-9 closed to prevent gas from the gas circuit and chambers 120, 121 from flowing through the filter assemblies 200, 201. In this way, any oxygen in the chambers 102, 121 and the gas circuit is not pulled through the filter housings 202, 203. One of the filter assemblies 200, 201 is then connected in-line with the gas flow once oxygen sensor I-4 detects that oxygen content is below a predetermined level and pressure transducer I-2 detects that the pressure of the inert gas in chambers 120, 121 is at a desired level. The filter assemblies 200, 201 may be subjected to a purge cycle before reconnection.

Through these steps, the atmosphere around the used filter elements E-5 and E-7 is maintained as a low oxygen atmosphere. If a significant amount of oxygen was to flow past the used filter elements E-5 and E-7, the combination of the small metal particles collected on the filter elements E-5 and E-7 and the oxygen could result in ignition of the particles and consequential destruction of the filter elements E-5, E-7.

Figure 5:
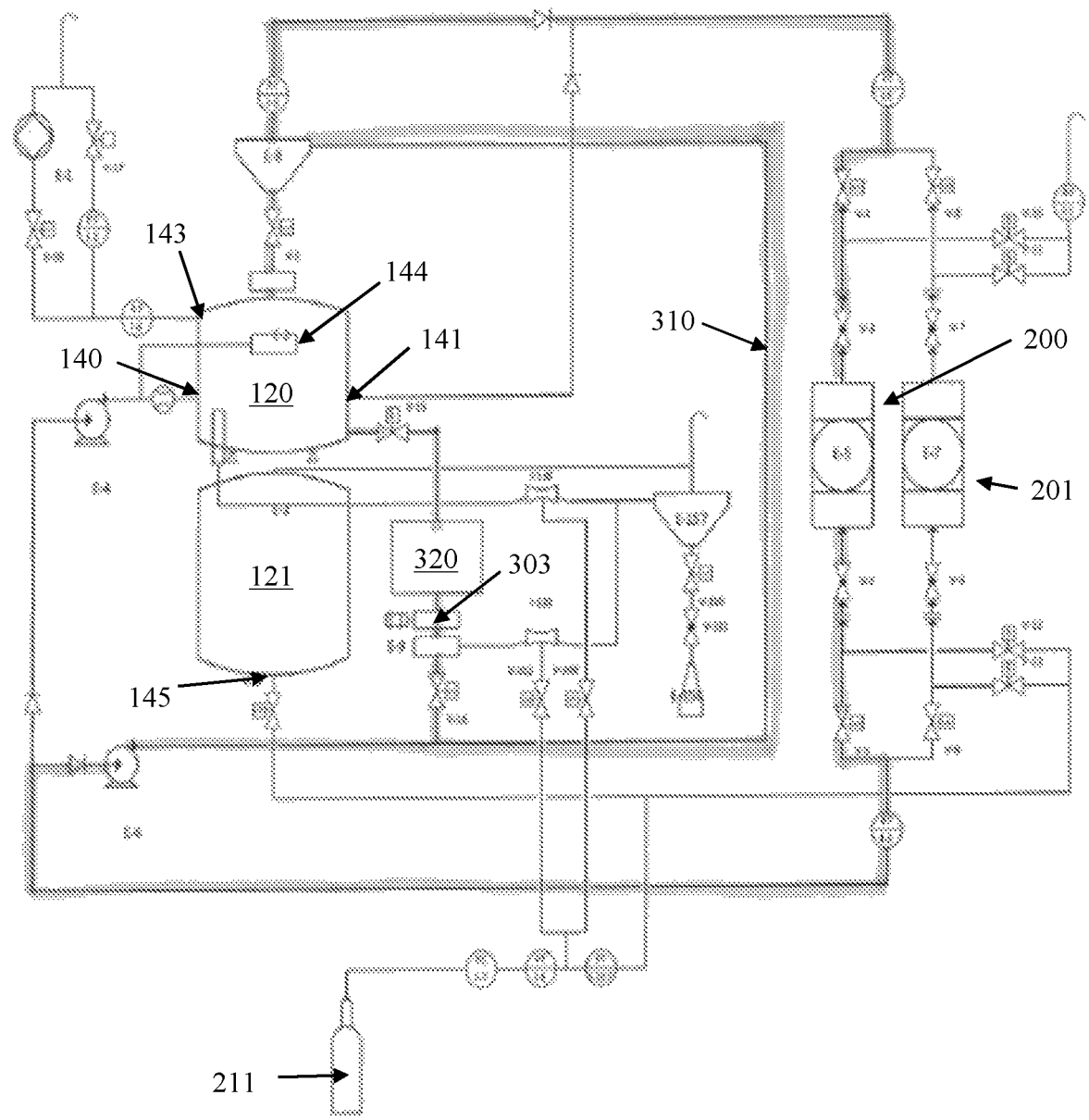
FIG. 5 is a circuit diagram of a gas flow circuit according to another embodiment of the invention comprising a powder transport circuit integrated into a gas recirculation circuit for generating gas flow through the build chamber.

FIG. 5 shows an alternative gas flow circuit for an additive manufacturing apparatus. Corresponding reference numerals are used for features of this embodiment that correspond to features of the gas circuit shown in FIGS. 3, 4a and 4b. The gas circuit of this embodiment additionally comprises a gas line 310 for transporting powder recovered from the build chamber 120 into a collection hopper 301 to a separator E8, from which the powder is delivered back into dispense hopper located in the build chamber 120 for us in the formation of further layers. The gas line 310 is integrated into the gas circuit 210 for generating a gas flow in the build chamber 120. In particular, gas line 310 is arranged in parallel to the gas line 210a for generating a gas flow in the build chamber 120. Gas line 310 comprises a pump E6 for generating gas flow along line 310.

The apparatus further comprises a powder overflow 302 that delivers powder pushed into the overflow by the wiper during the formation of a layer and/or recovered from the powder bed in the collection hopper 320. A valve V19 is arranged in the overflow 302 to permit/prevent flow of powder via the overflow 302 to the collection hopper 320. Powder from the collection hopper 320 is delivered into the gas line 310 via a screw-feed 303 and a sieve E9, which prevents large particles from entering into gas line 310. A valve V16 is provided to permit/prevent the flow of powder from the collection hopper 320 into gas line 310.

Large particles collected on the sieve E9 may be carried to a further separator E157 by a further gas flow.

To change a material used with the apparatus, a user provides appropriate inputs to computer 130 to indicate at the end of a build that a material changeover is to take place. At the end of the build, the computer 130 ensures pump E4 is stopped such that there is no gas flow though the build chamber 120 but activates pump E6 to generate gas flow though the gas circuit including gas line 310 and filter element E5 and/or E7. In this way, powder remaining in the gas circuit is carried by the gas flow to the separator E8 and collected in the hopper inside the build chamber 120 or to one of the filter elements E5, E7 where the particles are captured. In this way, the gas circuit is cleaned of particles such that the particles cannot contaminate the new material to be used with the apparatus for future builds.

The build chamber 120 itself will be cleaned by other means, for example manually by the operator. Furthermore, other elements, such as the sieve E-9, separator E-8 and filter elements E-5 and E-7 may be replaced with a clean sieve, separator and filter elements for builds with the new material. To introduce a new material, hopper 320 is removed and replaced with a new hopper 320 containing the new material. The new material is then transported to the hopper in the build chamber using the powder transport line 310.

In this way, the apparatus automates part of the cleaning process and provides means for cleaning parts of the apparatus that cannot be easily cleaned by other means, such as manually.

Figure 6:
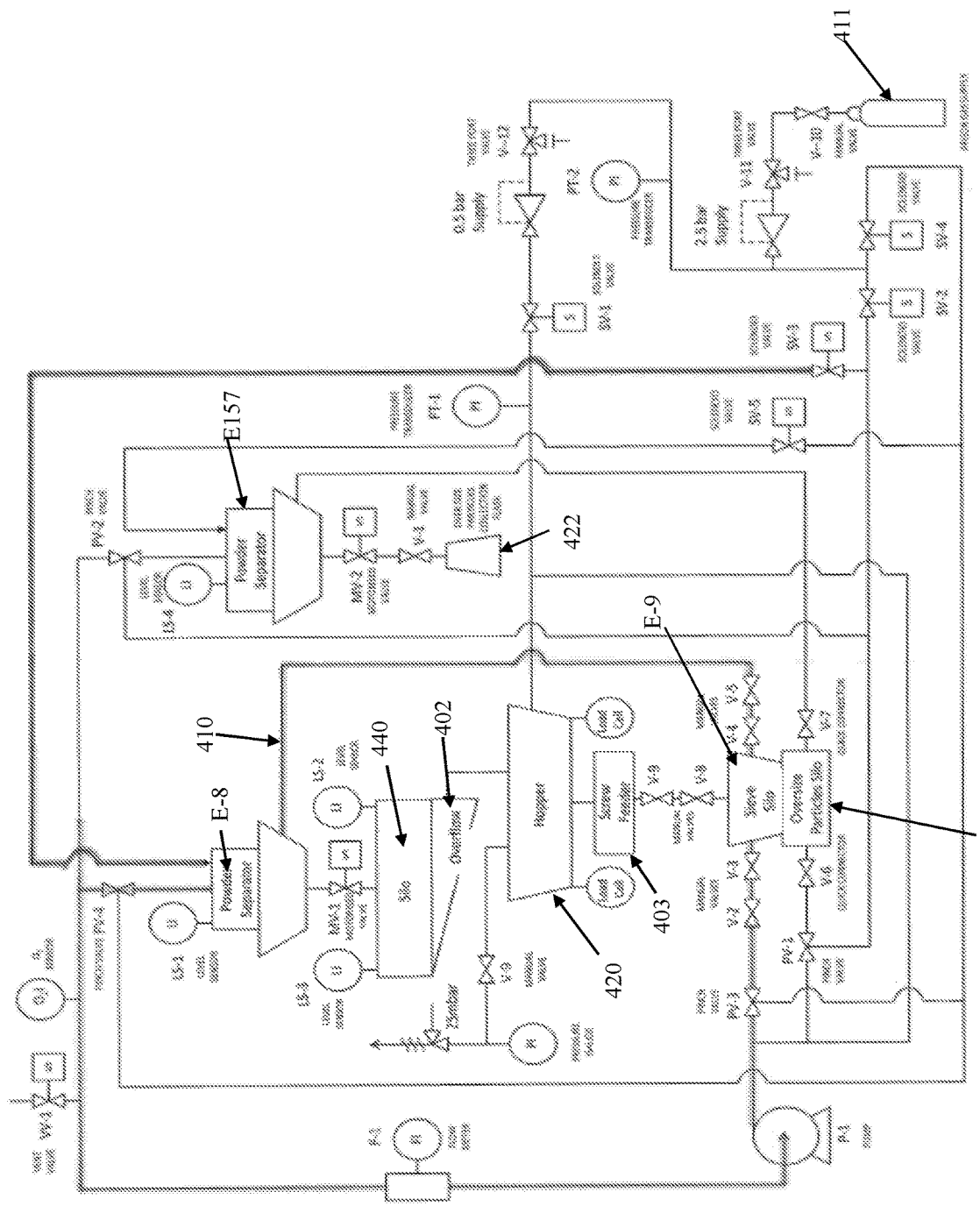
FIG. 6 is a circuit diagram of a gas flow circuit according to yet another embodiment of the invention for transporting powder that is separate from a gas circuit for generating gas flow through the build chamber.

FIG. 6 shows a gas circuit for transporting powder in the apparatus according to another embodiment of the invention. In this embodiment, the circuit 410 for transporting powder recovered from the build chamber (not shown) back to the hopper 440 in the build chamber is separate from the gas circuit 210 for generating gas flow through the build chamber.

Like the apparatus shown in FIG. 5, the powder transport comprises a powder overflow 402 that delivers powder pushed into the overflow by the wiper during the formation of a layer and/or recovered from the powder bed in the collection hopper 420. Powder from the collection hopper 420 is delivered into the gas circuit 410 via a screw-feed 403 and a sieve E9, which prevents large particles from entering into gas line 410. Manually operated valves V-8, V-9 can be used to permit/prevent the flow of powder from the collection hopper 420 into gas line 410.

Large particles separated by the sieve E9 are collected in an oversize particle silo 421 and can be carried to a further separator E157 by a further gas flow for deposition in an oversize particle collection flask 422. The oversize particle scan then be removed by detaching the oversize particle collection flask 422 from the apparatus.

Suitable valves V-2, V-3, V-4, V-5, V-6, V-7 are provided to allow release of the sieve E9 and the oversize particle silo 421 for replacement and/or cleaning.

For particles that are allowed to pass through the filter of sieve E9, a gas flow generated by pump P-1 carries the particles through the gas line to powder separator E-4. Powder separator E-4 comprises a baffle (not shown) for slowing the gas flow to cause the particles to drop out of the gas flow and fall into silo/hopper 440 within the build chamber (not shown). Gas passing out of the separator E-4 passes through a fine particle filter (not shown) that removes any small particles that are sufficiently light to be carried out by the slow gas flow towards the outlet at the top of the separator E-4. Upon leaving the separator E-4, the gas flows through flow meter F-1 and back to pump P-1 for recirculation. Suitable connections are made to an argon gas supply 411 for supplying argon to various parts of the gas circuit to ensure that the powder is transported and collected under an inert atmosphere.

As with the embodiment shown in FIG. 5, to change a material used with the apparatus, a user provides appropriate inputs to computer 130 to indicate at the end of a build that a material changeover is to take place. At the end of the build, the computer 130 activates pump P-1 to generate gas flow though the gas circuit 410. In this way, powder remaining in the gas circuit 410 is carried by the gas flow to the separator E8 and collected in the hopper 440 inside the build chamber. In this way, the gas circuit 410 is cleaned of particles such that the particles cannot contaminate the new material to be used with the apparatus for future builds.

The build chamber itself will be cleaned by other means, for example manually by the operator. Furthermore, sieve E9 and separator E-8 may be replaced with a clean sieve and separator for builds with the new material. To introduce a new material, hopper 420 is removed and replaced with a new hopper 420 containing the new material. The screw-feeder 403 may be integrated into the collection hopper 420 such that replacement of the collection hopper 420 also introduces a new screw-feeder 403. The hopper 440 in the build chamber may also be manually cleaned and/or replaced. The new material is then transported to the hopper 440 in the build chamber using the powder transport line 410.

It will be understood that alterations and modifications may be made to the embodiments as described herein without departing from the invention as defined in the claims. For example, the device for purging oxygen from the filter assemblies may comprise a vacuum pump as well as an inert gas supply.

In one embodiment, rather than a purely mechanical arrangement for clamping the filter assemblies to the apparatus when the manual valves are open, the apparatus may comprise suitable sensors, such as micro-switches for determining when the manual valves are open, and the computer 130 actives an electronically operated clamping mechanism to prevent removal of the filter assembly. Upon closure of the manually operated valves, the clamping mechanism is released under the control of computer 130 to allow for removal of the filter assembly.

The invention claimed is:

1. An additive manufacturing apparatus for building a part by selectively consolidating flowable material in a layer-by-layer process, the apparatus comprising:
 a build chamber for building the part;
 a scanner comprising at least one optical element that is movable to direct a laser beam to consolidate flowable material in the build chamber;
 a gas flow circuit for generating a gas flow through the build chamber;
 at least one filter assembly arranged in the gas flow circuit, the filter assembly having associated therewith a valve operable to seal the gas circuit upstream from the filter assembly and a valve operable to seal the gas flow circuit downstream of the filter assembly, the arrangement allowing a filter element of the filter assembly to be changed whilst maintaining a controlled atmosphere in the build chamber;
 an inlet between the filter element of the filter assembly and one of the valves for introducing inert gas into the filter assembly;
 a vent between the filter element and the other of the valves; and
 a purging device comprising an inert gas supply, an inert gas supply valve operable to control the flow of inert gas from the inert gas supply to the filter assembly via the inlet and a controller operable to control the inert gas supply valve to open the inert gas supply valve in response to receiving a signal indicating that the filter element has been changed and before the valves associated with the filter assembly are opened to connect the filter assembly in line with the gas flow through the build chamber to flush the filter assembly with an inert gas to push air from the filter assembly out of the vent.

2. An additive manufacturing apparatus according to claim 1, wherein the inlet and vent are located such that inert gas is flushed through the filter element in an opposite direction to the gas flow when the filter assembly is connected in gaseous communication with the build chamber.

3. An additive manufacturing apparatus according to claim 1, comprising a first filter assembly and a second filter assembly arranged in parallel within the gas flow circuit, wherein the purging device is arranged to flush one of the first filter assembly and the second filter assembly whilst the other of the first filter assembly and the second filter assembly is connected to filter particulates from the gas flow.

4. An additive manufacturing apparatus according to claim 1, wherein the purging device further comprises an oxygen sensor for generating a signal indicative of an oxygen content within the filter assembly and the controller is operable to open of the valves associated with the filter assembly to connect the filter assembly in line with the gas flow through the build chamber after the oxygen content detected by the oxygen sensor is below a predetermined level.

5. An additive manufacturing apparatus for building a part by selectively consolidating flowable material in a layer-by-layer process, the apparatus comprising:
   a build chamber for building the part;
   a scanner comprising at least one optical element that is movable to direct a laser beam to consolidate flowable material in the build chamber;
   a gas flow circuit for generating a gas flow through the build chamber;
   at least one filter assembly arranged in the gas flow circuit, the filter assembly having associated therewith a valve operable to seal the gas circuit upstream from the filter assembly and a valve operable to seal the gas flow circuit downstream of the filter assembly, the arrangement allowing a filter element of the filter assembly to be changed whilst maintaining a controlled atmosphere in the build chamber; and
   a purging device comprising an inert gas supply, an inert gas supply valve operable to control the flow of inert gas from the inert gas supply to the filter assembly, a pump arranged to apply a low pressure or a vacuum pressure to the filter assembly to remove air from the filter assembly when the valves associated with the filter assembly have sealed the filter assembly from the gas flow and a controller operable to control the inert gas supply valve to open the inert gas supply valve in response to receiving a signal indicating that the filter element has been changed and before the valves associated with the filter assembly are opened to connect the filter assembly in line with the gas flow through the build chamber to flood the filter assembly with an inert gas.

6. An additive manufacturing apparatus according to claim 5, wherein the purging device further comprises an oxygen sensor for generating a signal indicative of an oxygen content within the filter assembly and the controller is operable to open of the valves associated with the filter assembly to connect the filter assembly in line with the gas flow through the build chamber after the oxygen content detected by the oxygen sensor is below a predetermined level.

7. An additive manufacturing apparatus according to claim 5, comprising a first filter assembly and a second filter assembly arranged in parallel within the gas flow circuit, wherein the purging device is arranged to flush one of the first filter assembly and the second filter assembly whilst the other of the first filter assembly and the second filter assembly is connected to filter particulates from the gas flow.

8. An additive manufacturing apparatus for building a part by selectively consolidating flowable material in a layer-by-layer process, the apparatus comprising:
   a build chamber for building the part;
   a scanner comprising at least one optical element that is movable to direct a laser beam to consolidate flowable material in the build chamber;
   a gas flow circuit for generating a gas flow through the build chamber;
   at least one filter assembly arranged in the gas flow circuit, the filter assembly having associated therewith a valve operable to seal the gas circuit upstream from the filter assembly and a valve operable to seal the gas flow circuit downstream of the filter assembly, the arrangement allowing a filter element of the filter assembly to be changed whilst maintaining a controlled atmosphere in the build chamber;
   an inlet between the filter element of the filter assembly and one of the valves for introducing inert gas into the filter assembly;
   a vent between the filter element and the other of the valves; and
   a purging device comprising an inert gas supply, an inert gas supply valve operable to control the flow of inert gas from the inert gas supply to the filter assembly via the inlet and a controller operable to control the inert gas supply valve to open the inert gas supply valve in response to receiving a signal indicating completion of an operation to get rid of reactive particles captured by the filter element and before the valves associated with the filter assembly are opened to connect the filter assembly in line with the gas flow through the build chamber to flush the filter assembly with an inert gas to push air from the filter assembly out of the vent.

9. An additive manufacturing apparatus according to claim 8, wherein the controller is operable to control the inert gas supply valve such that the filter assembly is flushed with inert gas to remove air from the filter assembly after the air has been introduced into the filter assembly during the operation on the filter element.

10. An additive manufacturing apparatus according to claim 9, wherein the operation is changing of the filter element.

11. An additive manufacturing apparatus according to claim 8, wherein the inlet and vent are located such that inert gas is flushed through the filter element in an opposite direction to the gas flow when the filter assembly is connected in gaseous in communication with the build chamber.

12. An additive manufacturing apparatus according to claim 8, comprising a first filter assembly and a second filter assembly arranged in parallel within the gas flow circuit, wherein the purging device is arranged to flush one of the first filter assembly and the second filter assembly whilst the other of the first filter assembly and the second filter assembly is connected to filter particulates from the gas flow.

13. An additive manufacturing apparatus according to claim 8, wherein the purging device further comprises an oxygen sensor for generating a signal indicative of an oxygen content within the filter assembly and the controller is operable to open the valves associated with the filter assembly to connect the filter assembly in line with the gas flow through the build chamber after the oxygen content detected by the oxygen sensor is below a predetermined level.

\* \* \* \* \*